United States Patent [19]
Akselrod et al.

[11] Patent Number: 5,128,076
[45] Date of Patent: Jul. 7, 1992

[54] APPARATUS AND METHOD FOR PRODUCING AN ELONGATE STRIP OF MATERIAL

[75] Inventors: Anatoly Akselrod; Mark A. Berman, both of St. Paul; James B. Cysewski, Falcon Heights; Steven J. Lenius, Woodbury, all of Minn.; John W. Louks, North Hudson, Wis.; David W. Osten, Stillwater, Minn.; Joseph W. Petrin, Woodbury, Minn.; Ronald P. Swanson, Maplewood, Minn.; Eugen Will, Woodbury, Minn.

[73] Assignee: Minnesota Mining and Manufacturing Company, St. Paul, Minn.

[21] Appl. No.: 673,285

[22] Filed: Mar. 21, 1991

[51] Int. Cl.⁵ .............................................. B29C 47/92
[52] U.S. Cl. ................................... 264/40.2; 264/40.3; 264/40.7; 264/503; 264/566; 264/569; 264/146; 425/140; 425/141; 425/142; 425/163; 425/315; 425/326.1; 425/381
[58] Field of Search .................. 264/40.2, 40.3, 40.1, 264/503, 40.7, 558-569, 145-147; 425/72.1, 326.1, 387.1, 327, 135, 163, 140-141, 142, 315, 325, 308, 164, 172, 381

[56] References Cited

U.S. PATENT DOCUMENTS

| | | | |
|---|---|---|---|
| Re. 289,959 | 9/1976 | Naito | 29/450 |
| 2,844,846 | 7/1958 | Kronholm | 425/326.1 |
| 3,313,870 | 4/1967 | Yazawa | 264/565 |
| 3,342,657 | 9/1967 | Dyer | 156/163 |
| 3,355,531 | 11/1967 | Barnhart et al. | 264/566 |
| 3,775,523 | 11/1973 | Haley | 264/566 |
| 3,784,347 | 1/1974 | Robinson | 425/387.1 |
| 3,814,785 | 6/1974 | Reade | 264/235 |
| 3,976,732 | 8/1976 | Herrington | 264/89 |
| 3,976,733 | 8/1976 | Havens | 264/89 |
| 4,061,707 | 12/1977 | Nohtomi et al. | 264/342 R |
| 4,118,453 | 10/1978 | Herrington | 264/89 |
| 4,138,453 | 2/1979 | Segl, Jr. | 264/40.1 |
| 4,189,288 | 2/1980 | Halter | 425/72 |
| 4,355,966 | 10/1982 | Sweeney et al. | 425/140 |
| 4,388,061 | 6/1983 | Bebok | 425/392 |
| 4,479,766 | 10/1984 | Planeta | 264/564 |
| 4,536,365 | 8/1985 | Zwick | 264/558 |
| 4,643,657 | 2/1987 | Achelophl et al. | 425/72 |
| 4,650,407 | 3/1987 | Taguchi | 425/72 |
| 4,655,988 | 4/1987 | Shinmoto et al. | 264/566 |
| 4,676,728 | 6/1987 | Planeta | 425/327 |
| 4,699,580 | 10/1987 | Co | 425/140 |
| 4,728,277 | 3/1988 | Planeta | 425/72 |
| 4,732,727 | 3/1988 | Havens | 264/519 |
| 4,753,767 | 6/1988 | Havens | 264/565 |

FOREIGN PATENT DOCUMENTS

| | | | |
|---|---|---|---|
| 3323817 | 1/1985 | Fed. Rep. of Germany | 425/387.1 |
| 57-95423 | 6/1982 | Japan | 264/567 |
| 58-166026 | 10/1983 | Japan | 264/567 |
| 63-151429 | 6/1988 | Japan . | |
| 1553881 | 10/1979 | United Kingdom . | |

*Primary Examiner*—Jeffery Thurlow
*Attorney, Agent, or Firm*—Gary L. Griswold; Walter N. Kirn; Charles D. Levine

[57] ABSTRACT

An open tube apparatus and method for continuously producing a rotating elongate strip of material are disclosed. An extrusion die continuously extrudes flowable material to form an open tube with a central longitudinal cavity and a transport mechanism includes a plurality of drive rollers which engage and pull the tube downline. A driver rotates the extrusion die and transport mechanism. A tube cutter, which is offset at an angle with respect to the downline direction and defines the open end of the tube, cuts the tube into a continuous elongate web of the desired width as the tube moves downline. An air seal seals the tube cavity to prevent air from escaping through the open end of the cavity, and a tube pressurizer controls air pressure in the central longitudinal cavity of the tube to expand the tube laterally outwardly.

23 Claims, 10 Drawing Sheets

APPARATUS AND METHOD FOR PRODUCING AN ELONGATE STRIP OF MATERIAL

TECHNICAL FIELD

The present invention relates to an apparatus for and a method of producing an elongate strip of material. More particularly, the present invention relates to an apparatus and method which continuously produces an elongate strip of material in an open tube process.

BACKGROUND OF THE INVENTION

Existing blown film processes involve blowing a film tube or bubble into a cylinder and maintaining the cylindrical form until the tube is converted to a web. The tube is blown and drawn out from a die and rotated at a substantially constant speed. Prior to conversion, the tube is collapsed into a two ply sheet to permit the blown film to be further treated and cut into a web. Recent representative examples of collapsed tube blown film processing are found in U.S. Pat. No. 4,189,288 to Halter and U.S. Pat. No. 4,699,580 to Co. Collapsing boards, rollers, or other tube restricting devices are used to seal and drive the film tube.

However, these closed nip processes have a propensity for wrinkling the film during collapsing. The folds formed during collapse of the tube are permanently creased and the portions around the folds are usually cut off and discarded. Also, the laminating force provided by the nip often causes the two film layers to stick together, thereby eliminating the possibility of coating or coextruding any material that this laminating would damage. Moreover, as the tube is closed, the nip blocks access to the inside of the tube, severely restricting processes such as internal tube cooling or coating. This causes blown film dies to be very complicated and expensive when the interior of the tube is to be treated; air channels must be machined through the extrusion die. Even with these air channels, air passing through the channels is warmed by the die as the die is cooled by the air, both of which are disadvantageous to the web forming process.

In U.S. Pat. No. 3,342,657 to Dyer, an apparatus for forming a thermoplastic film is disclosed which forms the film in a tube and cuts the tube into webs without closing the tube. However, although this system uses an annular rotating extrusion die, the tube is not blown. Rather, the tubular film is pulled over mandrels within the tube which serve as cooling and heating devices. Additionally, the tube is stretched and oriented between the mandrels. These mandrels block access to the interior of the tube during tube formation and no devices control the external diameter of the tube. Moreover, rollers must be placed inside the tube to transport the tube downline.

Japanese Kokai Publication No. JP63-151429 to Goto is directed to a method of producing flat films using an open tube process. However, the apparatus appears to be inoperative as shown. Additionally, there is no control over the size of the tube and no way to prevent the tube from contacting the internal stage barriers and stopping operation. Changing the internal air pressure is the only method disclosed of varying the diameter of the tube. However, this simplistic approach is not sufficiently precise to produce commercially acceptable, uniformly thick webs and air leakage further complicates operation.

Additionally, the slitting devices and tube stabilizing apparatus components of known web forming systems suffer from numerous drawbacks. Known slitting devices for cutting a flat web from a tube slit in the machine or longitudinal direction or with a slight, oscillating bias, and offer very little spreading of the web caliper variation. This can lead to hard bands in wound rolls, which result from nonuniform web caliper.

Numerous types of apparatus for stabilizing a blown film tube are known. Sizing cages include a cylindrically-shaped shell of small diameter rollers must be positioned above the tube frost line to prevent the tube from sticking to the rollers and creating surface defects. However, this location virtually eliminates any size limiting features of the cages as the tube is already solidified. Internal mandrels over which the tube is physically stretched to a final diameter require an internal heat removal mechanism which makes startup and operation difficult and increasing costs. Contact between the tube and the mandrel also causes surface defects.

Rings of air chambers are described in U.S. Pat. No. 3,976,732 to Herrington and U.S. Pat. No. 4,728,277 to Planeta. In Herrington, a plurality of air rings are positioned around the blown tube and have differing diameters to mechanically define the diameter of the blown tube. The rings form a conical, rather than cylindrical shape which do not provide as stable a film diameter. Planeta discloses a film handling device in which a plurality of stabilizing devices which create axially aligned air rings control the shape of a blown tube. Each device uses two oppositely moving air streams parallel to the tube wall to create a low pressure zone to hold the film in position. This does not produce a sufficiently stable film diameter. Additionally, these complex air-based systems rely on the air to impinge on and flow around the blown tube rather than providing a continuous cushion for the tube.

U.S. Pat. No. 4,655,988 to Shinmoto et al. discloses a vacuum system for regulating the diameter of an extruded, blown tube. In this system, a plurality of air-introducing arms are twisted like a vortex to form a structure in which the internal diameter is physically adjustable like a diaphragm. While the air provides a buffer between the arms and the film, it is the changing internal diameter of the physical structure which regulates the size of the tube.

Size feedback systems measure the diameter of the blown film tube above the frostline and vary the amount of air in the tube interior to control the diameter. These devices monitor the tube diameter with sonar or optical sensors. However, as the tube is formed to its final diameter, this method involves compensating for an error in size which has already occurred. This results in a tube having varying diameter depending on each response of the air control system. Additionally, in all known systems, this is accomplished as part of a sealed tube operation in which the tube is sealed typically at a two roller nip. In these systems, the tube diameter expands or contracts as a result of the air volume and pressure change and measurable diameter changes are required to attain a correcting action. This is not fast or accurate enough to permit the use of these systems with diameter control with open tube systems.

Moreover, these size feedback systems for controlling diameter are inadequate when an internal, imperfect seal or plug is used instead of the two roller nip. The tube diameter responds to very slight changes in internal pressure and volume. None of these pressure control systems can respond quickly and accurately enough to prevent diameter changes due to seal leaks. These systems are therefore unacceptable for use with the imperfect seals of open tube processes. Furthermore, in these methods, process disturbances, such as changes in polymer properties or temperature can result in a larger diameter tube and a slightly lower frost line height.

SUMMARY OF THE INVENTION

The open tube or open bubble type web forming process overcomes these disadvantages of closed tube processes and offers many additional advantages such as internal tube cooling and coating. This invention provides an apparatus and a method for continuously producing an elongate strip of material, such as a strip of tape having an adhesive-coated surface, without intermediate manual handling steps and without wasteful trimming of the edges. The system is totally integrated from raw materials to finished product, and eliminates the need to trim the edges to achieve the desired width of product. This reduces manufacturing costs, as trimming costs can be very high for some products. The open tube process allows a much wider range of internal tube operating pressures and allows relatively easy access to the interior of the tube from downline of the extrusion die. This can be provided by a volume control system including a conventional proportional air regulator.

Slitting is conducted on a bias, thereby eliminating winding problems associated with crossweb caliper variation and greatly improving roll stability and appearance. A single continuous strand of material can be produced to facilitate manufacture of long lengths of material and level wound products. Moreover, the open tube system can make tape of widths ranging from 5 mm up to the circumference of the tube, and can change the width of the tape while producing the strip without stopping the process. This process and system is a very flexible unit width maker as the produced film or tape does not require subsequent slitting or converting.

The apparatus of the invention includes a frame, an extrusion die mounted on the frame, a transport mechanism mounted on the frame downline of the extrusion die, and a tube cutter mounted on the frame downline of the transport mechanism. The extrusion die continuously extrudes thermoplastic material from a stationary extruder in the downline direction to form a tube with a central generally cylindrical longitudinal cavity. The novel transport mechanism includes drive rollers positioned to engage the tube and pull the tube in the downline direction. A driver rotates the extrusion die and transport mechanism together relative to the tube cutter. This provides relative rotation between the tube and the tube cutter. The tube cutter, which is offset at an angle with respect to the downline direction, cuts the tube into a continuous elongate web or strip of the desired width as the tube moves downline. An air seal is mounted on the frame for substantially sealing the tube cavity to prevent air from escaping through the open end of the cavity. A tube pressurizer controls air volume in the central longitudinal cavity of the tube to expand the tube laterally outwardly to within the desired range.

A novel constraining structure locates the tube concentric with the extrusion die and physically prevents the tube from expanding beyond the inner diameter of the constraining structure. The constraining structure also includes an air bearing which precisely maintains a selected constant tube diameter.

In the method of the invention an elongate strip of material is produced by extruding thermoplastic material through an annular die orifice in a downline direction to form a tube with a central generally cylindrical longitudinal cavity. The central longitudinal cavity of the tube is pressurized to expand the tube laterally outwardly to an outer diameter within a predetermined range, and the tube is transported downline by a transport mechanism, which includes a plurality of drive rollers engaging and pulling the tube. The tube is cut by a tube cutter into a continuous elongate strip. The cutter is offset at an angle with respect to the downline direction and defines an open end of the central cavity of the tube. The relative rotation between the tube and the tube cutter allows the tube cutter to cut the tube into a substantially continuous strip of a desired width as the tube moves downline. The tube cavity is sealed to prevent air from escaping through the open end of the cavity.

DETAILED DESCRIPTION OF PREFERRED EMBODIMENTS

Figure 1:
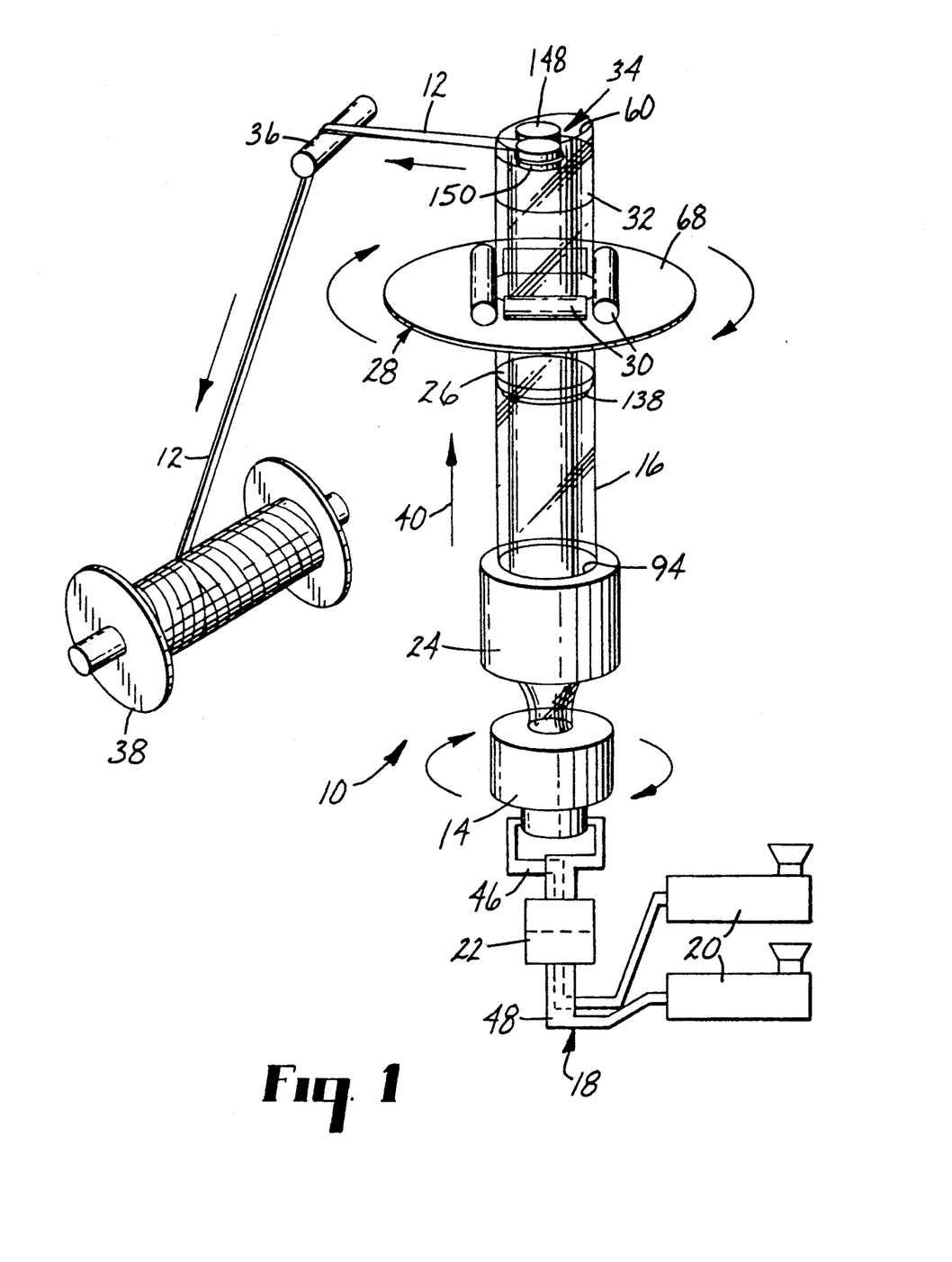
FIG. 1 is a schematic illustration of the primary components of the apparatus of the invention.
Figure 2:
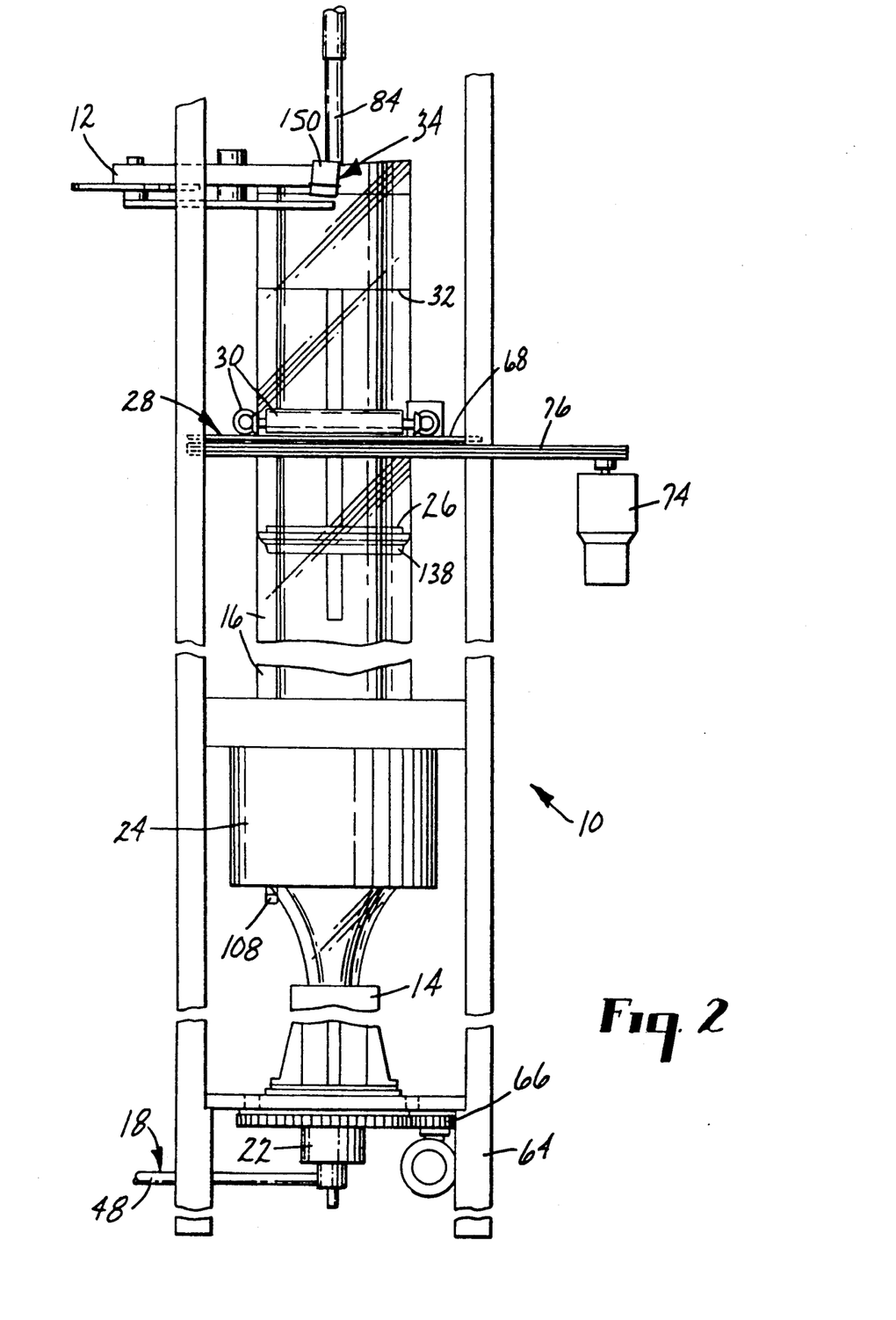
FIG. 2 is a front elevation of the apparatus of the invention, illustrating the arrangement of an extrusion die, constraining structure, air seal, transport mechanism, and tube cutter.

Referring first to the schematic illustration of FIG. 1, apparatus 10 is designed to continuously produce an elongate web or strip 12 of material, including single and multiple layer strips 12, such as adhesive-coated tape. The apparatus 10 generally includes a rotatable extrusion die 14 for extruding a flowable material, such as a thermoplastic polymer material to form a bubble or tube 16. The flowable material travels to the extrusion die 14 via conduits or passageways 18 from one or more extruders 20. A swivel joint 22 permits the passageways 18 to transport material to the extrusion die 14 while it is rotating. Two extruders 20 are used, for example, to produce an adhesive-coated backing. One extruder 20 produces the backing material and the other extruder 20 produces the adhesive material. Upon leaving the extrusion die 14 the tube 16 passes through a diameter constraining device 24 which maintains a constant tube diameter. A lip seal 26 is disposed within the tube 16 downstream of the diameter constraining device 24 and a transport mechanism 28, including a plurality of rollers 30, is located downstream of the lip seal 26. The tube 16 then passes over a mandrel 32 and a slitter or tube cutter 34 cuts the tube 16 into at least one elongate strip 12. The tube cutter 34 continuously cuts the tube 16 into the strip 12 as the extrusion die 14 and tube 16 rotate relative to the tube cutter 34. The strip 12 then passes around an idler roller 36 and is wound on a winder, such as level winder 38.

As used herein, "downline" refers to the general direction that material, e.g., the tube 16, moves when being processed by the apparatus 10. In the figures, the downline direction is upward from the extrusion die 14, as illustrated by the arrow designated by the reference numeral 40 in FIG. 1. Downline does not imply any relationship to vertical or horizontal directions.

EXTRUDER

Figure 6:
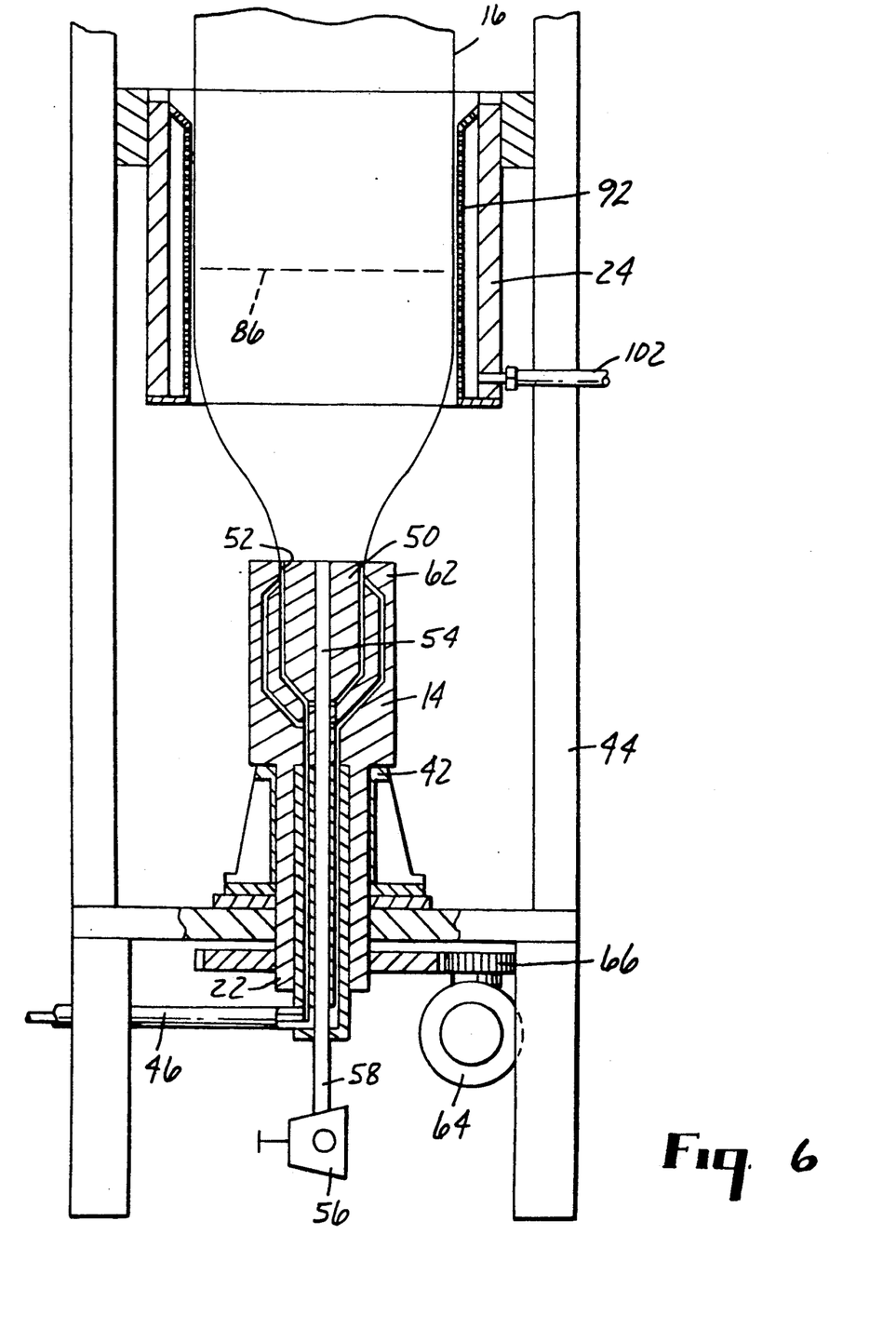
FIG. 6 is an enlarged front elevation of the extrusion die and constraining structure of FIG. 2, with portions cut away to illustrate details.

Referring to FIGS. 1 and 6, the extrusion die 14 may be of a conventional heated design used in blown film processes, and preferably is of the type for co-extruding a multilayer tube 16 having, for example, a polymeric backing layer and a pressure-sensitive adhesive ("PSA") or other adhesive layer along the outside of the tube 16. See U.S. Pat. Nos. 3,342,657; 4,643,657; and 4,753,767; Japanese Kokai No. 63-151429; and British Patent No. 1,553,881 (which are incorporated herein by reference) for descriptions of various blown film extrusion dies.

The extrusion die 14 is rotatable, and may be mounted on the center of a rotating table 42, which is mounted on a frame 44. The table 42 rotates at speeds of up to 115 rpm. A delivery line 46 is located directly below the die 14 at the center of the axis of rotation and is the portion of the passageways 18 which connects to the swivel joint 22 which is a rotary union. The swivel joint 22 can be any commercially available part used for handling high viscosity fluids at temperatures up to 288° C. (550° F.) and pressures up to $41 \times 10^6$ N/m² (6000 psi). The stationary end of the swivel joint 22 is connected by another delivery line 48 to the stationary extruders 20 so that the flowable material can be delivered to the rotating die 14 from each extruder 20. The extrusion die 14 is electrically heated, with the wiring connections being made through a slip ring assembly mounted concentrically to the delivery line 46 and centered on the axis of rotation. This arrangement allows for complete rotation of the die 14 during operation. This rotational motion is transmitted to the extruded tube 16.

The extrusion die 14 preferably includes a mandrel 50 and an annular opening 52 surrounding the mandrel 50. The flowable material is substantially continuously extruded through the annular opening 52 to form a generally cylindrical tube 16, which moves along its central longitudinal axis in the downline direction as the tube 16 is formed. An air passageway 54 is provided through the mandrel 50 and extrusion die 14. One end of the air passageway 54 is in fluid communication with a source 56 of pressurized air via an air conduit 58 and the other end of the air passageway 54 is in fluid communication with the central longitudinal cavity 60 of the tube 16. Pressurized air is provided through the air passageway 54 to the central cavity 60 of the tube 16 during the initial start-up of the apparatus 10 to inflate and expand the tube 16. The air passageway 54 is sealed with a suitable valve mechanism (not shown) during regular operation of the apparatus 10. The inflation of the tube 16 results in a blown tube as distinguished from a non-inflated tube. An air cooling ring 62 is mounted on the downstream end of the extrusion die 14 and serves as a directing device to cool the blown film tube 16 exiting the die 14.

Two stationary extruders 20 may be provided for melting, mixing and delivering the flowable material and any adhesive material to the extrusion die 14 via a rotary union 22. Two extruders 20 are used when one extruder 20 extrudes a backing material and the other extrudes an adhesive material to produce a web of backed adhesive. The adhesive layer is typically on the outside of the tube 16. These extruders 20 may be of any suitable design, such as a screw-operated extruder having a driven screw that melts and pushes material through a heated barrel for delivery to the extrusion die. The extruders 20 do not rotate with the extrusion die 14.

DRIVER

A driver 64 is mounted on the frame 44 for rotating the extrusion die 14 and transport mechanism 28 relative to the tube cutter 34. The tube cutter 34 can rotate while the extrusion die 14 and transport mechanism 28 remain stationary, although it is preferred that the cutter 34 remain stationary while the extrusion die 14 and transport mechanism 28 rotate. This provides relative rotation between the tube 16 and the tube cutter 34 to enable the tube cutter 34 to cut the tube 16 into a substantially continuous web or strip 12 of a desired width as the tube 16 moves downline without using a plurality of knives. The driver 64 can be a DC servomotor with a tachometer which controls the rotation speed of the die 14 by an input voltage signal, and which may be connected to the die 14 by drive gears 66.

TRANSPORT MECHANISM

Figure 3A:
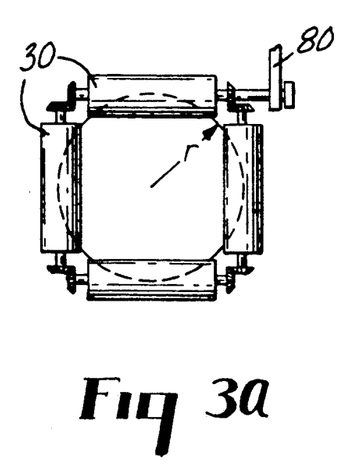
FIGS. 3a and 3b are schematic illustrations showing the diameter ranges of the transport mechanism.
Figure 3B:
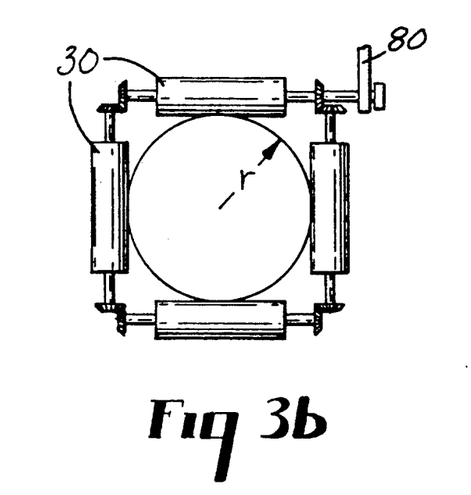

The transport mechanism 28 is mounted on the frame 44 downline of the extrusion die 14 and pulls the tube 16 in a downline direction. The transport mechanism 28 pulls the open tube 16 without distorting or closing the tube 16 thereby allowing access to the tube 16 from the downline side of the tube 16. Additionally, the transport mechanism 28 drives from the outside of an open, flexible tube 16 rather than from the top of a closed portion of the tube as in known methods. Thus, the tube 16 is driven from only one side by engaging the tube 16 on only the outside of the tube 16 without contacting the inside of the tube 16. The transport mechanism 28 includes a plurality of, and preferably four, drive rollers 30 positioned to engage and pull the tube 16 downline. The drive rollers 30 are preferably uniformly distributed around the tube 16. Thus, the drive rollers 30 are mounted on preferably all of the sides of a regular polygon, such as a square when four drive rollers 30 are used. When four drive rollers 30 are used, the drive rollers 30 are positioned on the sides of a square having a perimeter preferably no smaller than the desired circumference of the tube 16 and no larger than eight times the desired radius of the tube 16 as illustrated in FIGS. 3a and 3b.

Figure 4:
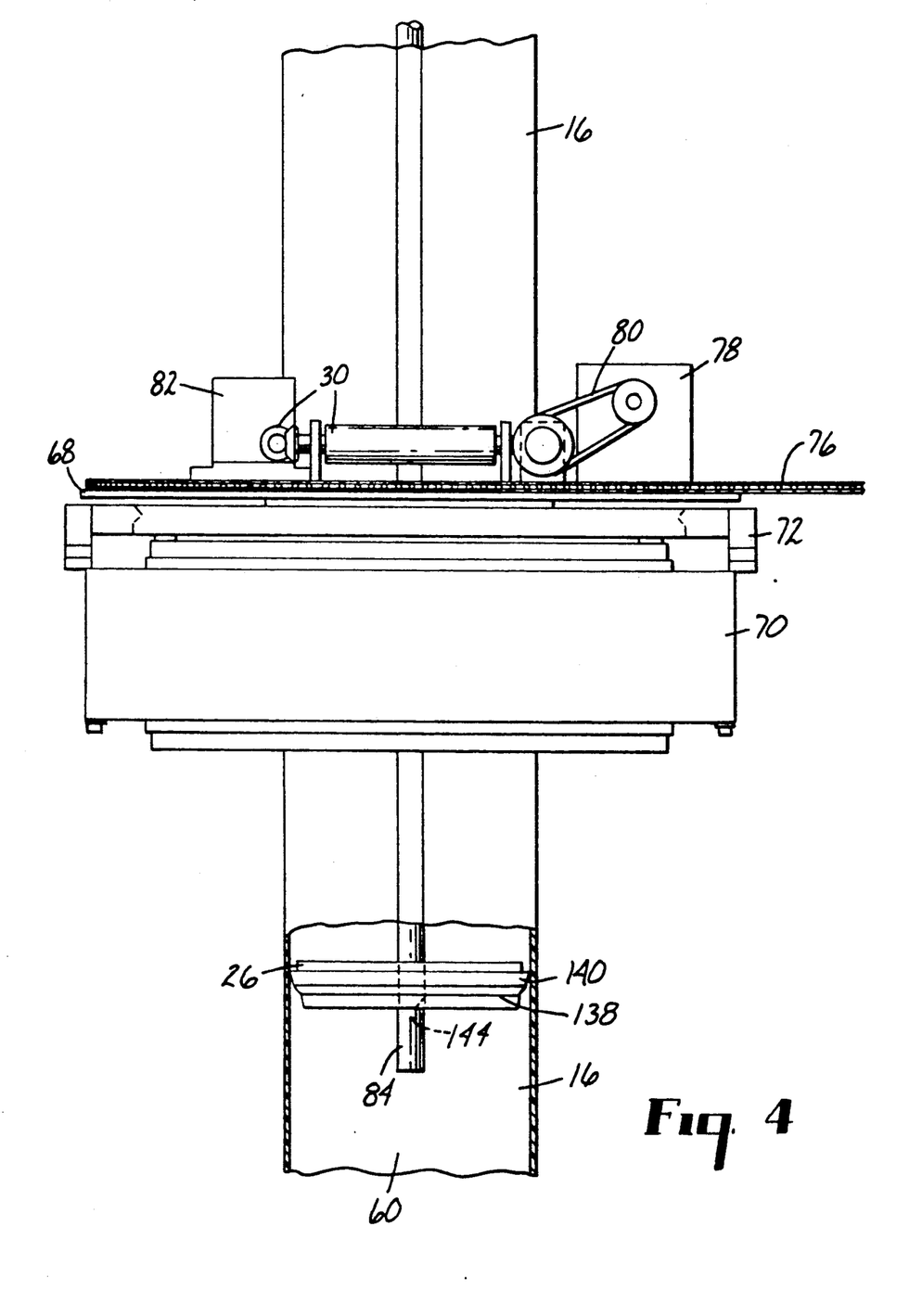
FIG. 4 is an enlarged side elevation of the transport mechanism and air seal of FIG. 2.
Figure 5:
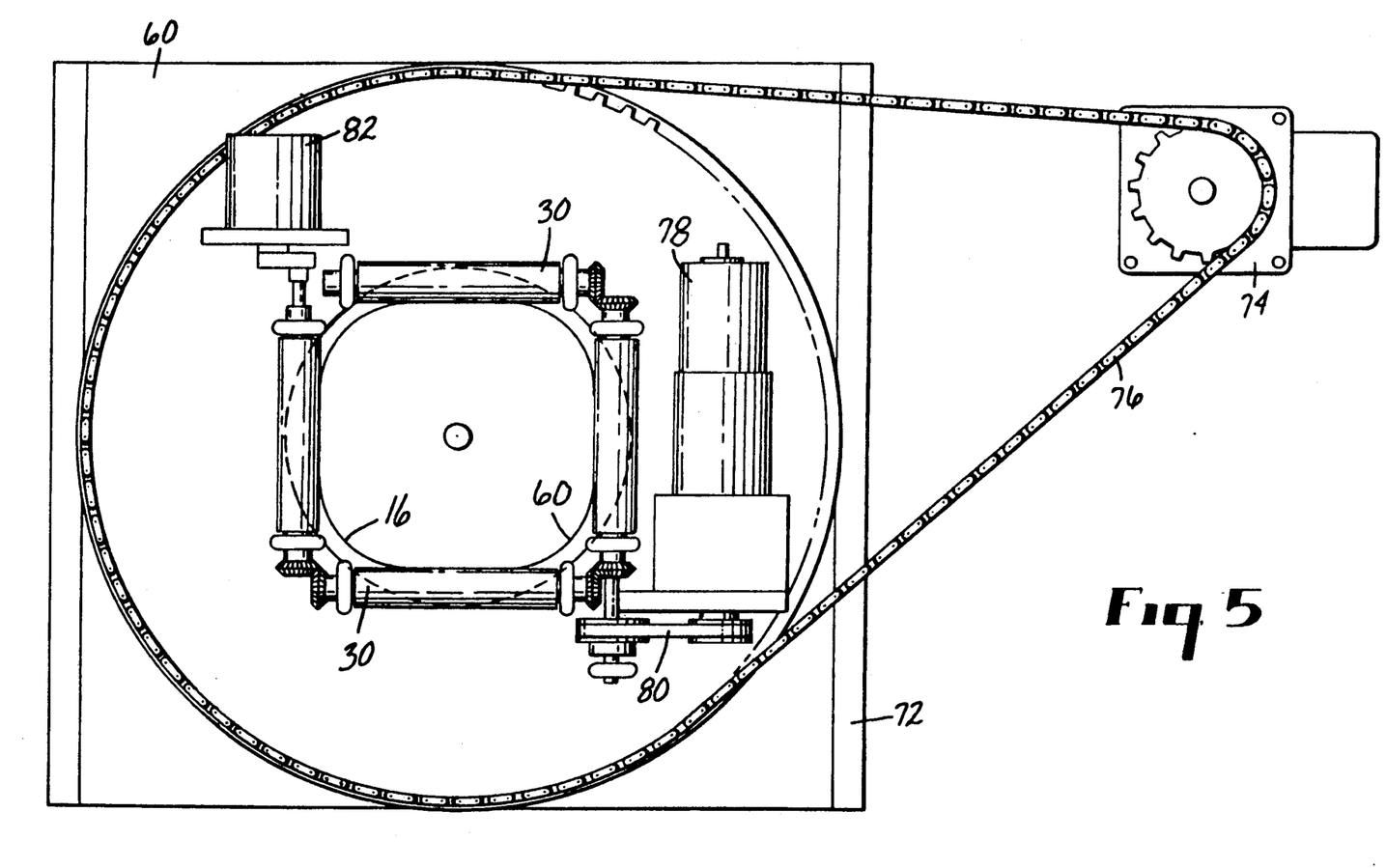
FIG. 5 is a cross-sectional view along line 5—5 of FIG. 4.

The drive rollers 30 are mounted on a rotary table 68 so that the downline velocity of the tube 16 and the rotation of the tube 16 can be independently controlled by similar motion of the drive rollers 30 through a slip ring assembly 70. The rotary table 68 is mounted on a support track 72, which serves as a bearing for the transport mechanism 28, and the slip ring assembly 70 is disposed upstream of the support track 72. Thus, the transport mechanism 28 controls the motion of the tube 16 in both the vertical and rotational directions. In the embodiment illustrated in FIGS. 4 and 5, separate motors are used to control downline velocity and rotation. A rotational motor 74 rotates the rotary table 68 through a drive chain 76 to provide rotational velocity. A drive motor 78 drives or rotates the drive rollers 30 through a drive belt 80 to provide downweb velocity. The motors 74, 78 can be conventional servomotors which operate through standard bevel gears or flexible cable. A tachometer 82 measures the rotational speed of the drive rollers 30.

The surface of the drive rollers 30 is preferably coated with a high friction, low tack silicon rubber which combines high friction characteristics with high release characteristics. The internal tube pressure forces the tube 16 against the rollers 30 and combines with the high friction to draw the tube 16 through the transport mechanism 28. The high releasability permits the tube 16 to pass between the rollers 30 without adhering to the rollers 30 and being damaged. The internal tube pressure which governs the operation of the transport mechanism 28 is controlled by the operation of the air mandrel 32 described below. The air pressure below the lip seal 26 is controlled by one or more support tubes 84 which are inserted into the interior of tube 16 through the lip seal 26 at one end and are connected to a source of pressurized air (not shown) at the other end. These tubes 84 inject or remove air to control the diameter of the tube 16. Additionally, it has been found that the transport mechanism 28 with four rollers 30 can generate over 89N (20 lbs) of lifting force depending on the material, far greater than is needed to draw the tube 16 through the apparatus 10 and far greater than expected to be provided by any one-sided transport mechanism 28.

CONSTRAINING STRUCTURE

The diameter constraining structure 24 is mounted on the frame 44 between the extrusion die 14 and the transport mechanism 28 and serves two important functions. It locates and aligns the tube 16 with the other components of the apparatus 10 and it controls expansion of the tube 16 to an outside diameter within a desired range after the tube 16 is formed by the extrusion die 14. The constraining structure 24 of the illustrated embodiments is cylindrical with both ends open to allow passage of the tube 16 through its interior. The constraining structure can also be elliptical or polygonal having a low aspect ratio as long as the circumference is nearly constant along the axis of the tube 16 in the region of the frost line 86. The constraining structure 24 is located to physically prevent excessive radial or lateral expansion of the blown film tube 16 in the region at and below the frost line 86, the line at which the flowable material of the tube solidifies. "Solidifies" is defined herein as the state change from a liquid to a solid phase. More precisely, the frost line 86 is the location where the tube film has cooled to a temperature at which the resistance of the film to further axial stretching is greater than the force exerted by the pressure difference between the interior and the exterior of the tube 16. Downline of the frost line 86, the tube 16 does not expand further.

Figure 7:
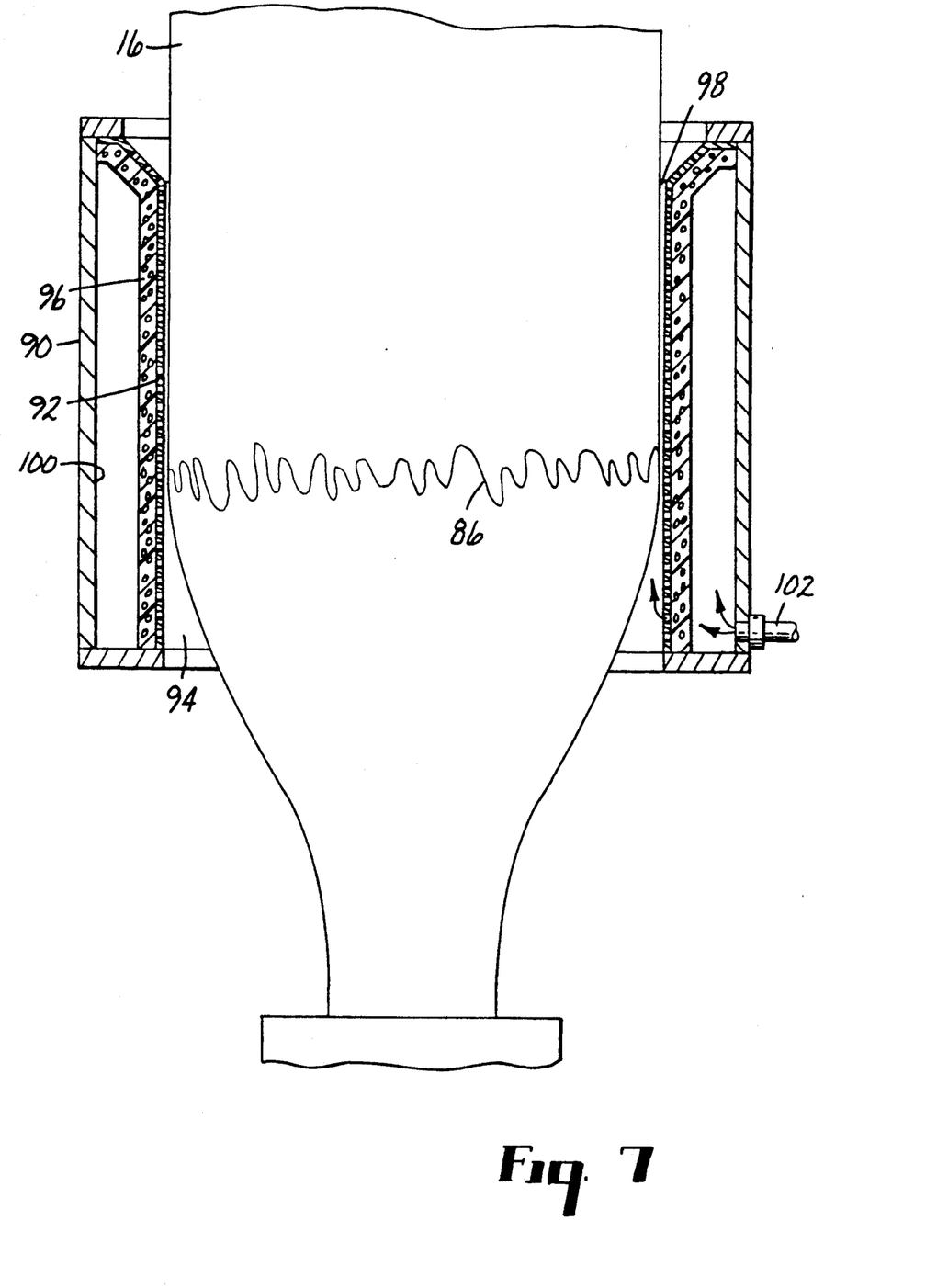
FIG. 7 is an enlarged cross-sectional view of the constraining structure of FIG. 6.

Referring to FIGS. 6 and 7, the constraining structure 24 is a cylindrical tube positioned downline of and concentric with the extrusion die 14 and air ring 62 and includes a casing 90 and an annular sleeve 92 in the casing 90. The annular sleeve 92 has a generally cylindrical central passageway 94 which receives the tube 16 to permit movement of the tube 16 along its longitudinal axis in the downline direction, while physically restricting movement in the lateral direction. The height of the sleeve 92 is dependent on the amount of variability in process conditions experienced by the tube 16 but ranges, in most cases, from one to six tube radiuses. The frost line 86 of the tube 16 is contained between the top and bottom of the sleeve 92. The sleeve 92 has an inside diameter approximately equal to or slightly larger than the desired final tube diameter to form the passageway 94.

The sleeve 92 must allow the molten tube material to slide thereby without significant friction or grabbing action, and should therefore have a low coefficient of friction. The tube 16 is pressurized to reach a diameter which is close to the internal diameter of the sleeve 92. In the preferred embodiment, a surface or layer of pressurized air 98 is used. This air bearing layer 98 also serves as a diameter adjusting mechanism to increase or decrease the tube diameter by decreasing or increasing, respectively, the air pressure at the inner surface of the sleeve 92. In this embodiment, the sleeve includes walls 96 which define an air chamber 100 separate from the passageway 94. An air inlet 102 provides pressurized air to the air chamber 100 from a source of pressurized air (not shown).

The sleeve 92 is porous; the porosity permits air to pass through the sleeve walls 96 of the sleeve 92 from the air chamber 100 to the passageway 94 to form the air layer 98 along the inner surface of the sleeve 92. The air layer 98 is at a sufficiently large pressure to constrain the tube 16 to the desired outer diameter while the tube 16 solidifies and to prevent the tube 16 from contacting the sleeve 92 and creating surface defects on the tube 16. When portions of the tube 16 do expand toward the sleeve 92, air flow is restricted and the air pressure adjacent these portions increases to force the tube 16 laterally inwardly and away from the sleeve 92 and to stabilize the tube 16 within the central passageway 94. In the illustrated embodiments, the porous material of the sleeve walls 96 is a microporous material having a flow rate of approximately 5.49 LPM/cm$^2$ with a pressure drop of 9.95 kN/m$^2$ and a flow rate of approximately 13.2 LPM/cm$^2$ with a pressure drop of 29.85 kN/m$^2$. The microporous material can be a porous metal or plastic. However, other porous materials having various pore sizes can be used. Any size pores 104 can be used as long as the desired pressure drop is attained. The constraining structure 24 is a continuous porous inner surface having a single chamber. The air layer 98 is also a continuous surface rather than being formed of a plurality of separate air streams. This permits lower air flow rates to be used to form the air layer 98 and permits the use of a smaller gap between the constraining structure 24 and the blown tube 16. This results in a final tube diameter that is more uniform than known diameter adjusting devices because the tube 16 is held at a constant position during solidification. Also, a temperature profile within the constraining structure 24 can be provided.

Thus, the constraining structure 24 uses an air floatation principle based on the balance of three forces: the force created by the pressure in the area outside the tube 16, but inside the constraining structure 24; the force created by the pressure inside the tube 16; and the force from the tension in the polymer tube 16. The tube 16 will move to a distance from the constraining structure 24 that balances these three forces. Static pressure is used to push the tube 16 away until the three forces are balanced, rather than using a dynamic venturi effect to suck the tube 16 toward the constraining structure 24. It is also possible to push the tube 16 away from the interior of the constraining structure 24 by a fixed distance to increase cooling and production rates.

The constraining structure 24 can be mounted on the frame 44 relative to the extrusion die 14 such that the constraining structure 24 can be adjusted within a predetermined range to locate the frost line 86 within the central passageway 94. As long as the frost line 86 remains within the casing 90, a constant diameter tube 16 will be produced. The sleeve 92 has a length generally parallel to the central longitudinal axis of the passageway 94 of between one half and three times the diameter of the passageway 94.

Furthermore, in known systems process disturbances change the tube diameter. When using the constraining structure 24, process disturbances change only the shape of the tube 16 by forming its final diameter at an upline level and moving the frost line 86 downline. However, the diameter of the tube 16 does not change because the tube 16 is contained within the constraining structure 24. Large disturbances, such as pin holes, excess seal or nip leak, or film porosity, can be compensated for by using a simple on-off control system mounted at the base of the constraining structure 24 to monitor and control the tube shape by injecting or removing air from the tube 16. Alternatively, another simple control system can use the diameter measurement to compare air pressure to the air bearing layer 98 to finely control and adjust the diameter.

The constraining structure 24 therefore increases the tube diameter stability over existing reactive methods, and steadies the tube 16 and increases the accuracy of point to point diameter measuring systems. This constraining structure 24 can control blown film tube diameter to within very small ranges such as less than 0.5% of the tube diameter while permitting significant changes in process conditions.

TUBE SENSOR

Figure 8:
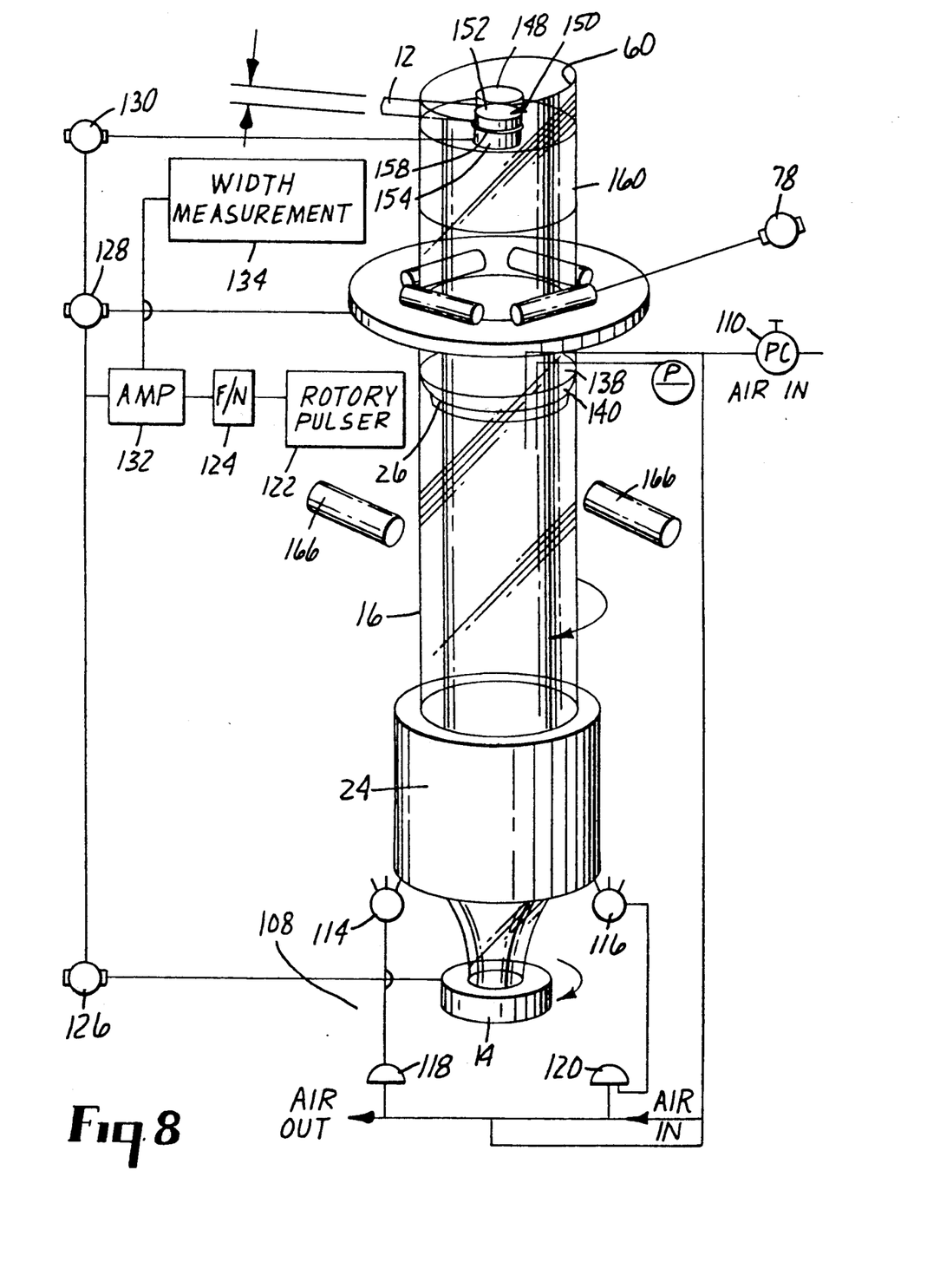
FIG. 8 is a schematic illustration of the tube sensing and controlling system of the apparatus of the invention.

As illustrated in FIG. 8, a tube sensing and controlling system 108 senses a portion of the tube 16 before the tube 16 enters the passageway 94 of the constraining device 24 and monitors the shape of the tube 16. The tube sensing system 108 then provides a signal to a tube pressure regulator 110 which can be a proportional controller with a manual set point. Based on this signal, the tube sensing system 108 adjusts the air volume inside the tube 16 to move the frost line 86 and adjust the tube diameter when the sensed portion of the tube 16 varies from the desired range.

The tube sensing and controlling system 108 is optical, and includes a simple on-off control system using two infrared (IR) beam sensors 114, 116 mounted upline of the constraining structure 24 in the illustrated embodiments. The IR beam sensors 114, 116 monitor the shape of the tube 16 and send signals to the pressure regulator 110, which is manually set to a target pressure to adjust the air volume in the central longitudinal cavity 60 of the tube 16. The first IR beam sensor 114 senses when a portion of the tube 16 entering the passageway 94 has an outer diameter larger than a first predetermined size. The first IR beam sensor 114 then provides a feedback signal to solenoid valves 118 indicating the overly large outer diameter. The solenoid valves 118 then open to decrease air volume in the tube cavity 60. A second IR beam sensor 116 senses when the portion of the tube 16 entering the passageway 94 has an outer diameter smaller than a second predetermined size smaller than the first predetermined size. The second IR beam sensor 116 then provides a feedback signal to different solenoid valves 120 indicating the small diameter. In this case, the solenoid valves 120 open to increase air volume in the central cavity 60 of the tube 16. If either sensor 114, 116 continuously operates, then the target air pressure is set either too high or too low and the set point of the pressure regulator 110 should be manually adjusted.

SLIT WIDTH CONTROL

A pulse generator 122 is connected to one roller 30 of the transport mechanism 28 and supplies a feedback signal to the digital controller of the drive motor 78 of the transport mechanism 28. This signal also is sent to a frequency to voltage (F/V) card 124 which supplies the reference voltage to servomotors 126, 128, and 130 which control the rotation of the die 14, transport mechanism 28, and tube cutter 34, respectively. The reference voltage for these servomotors 126, 128, 130 is trimmed or amplified by amplifier 132 to control the relation between the downline feed velocity and the rotational velocity and hence the slit width as measured by width measurer 134. The amount of trim or amplification is automatically adjusted around a set point to maintain a constant slit width.

AIR SEAL

The air or lip seal 26 is mounted on the frame 44 for sealing the central cavity 60 of the tube 16 to prevent air from escaping through the open end of the cavity 60 and help control the pressure within the tube 16. The seal 26 is a plug or disk-shaped body 138 with an elastomeric outer lip 140 and seals the blown film tube 16 so that the tube 16 can be pressurized to a level above atmospheric pressure. The outer lip 140 of the seal 26 is a smooth rounded surface that is preferably molded from an elastomeric material such as a fluoroelastomer. The lip 26 is positioned against the inside surface of the tube 16 with a circumferential spring 142 which achieves and maintains continuous contact between the seal 26 and the tube 16. This minimizes leakage over the range of diameter variations. As a modification of the seal 26, a low friction material can cover the lip 140 to reduce pull force and chatter. This allows the film 16 to slide smoothly over the seal 26 without grabbing and distorting and without the application of excessive drawing force. The lip seal 26 provides access to the upline section of the tube 16 through passageways 144 formed through the seal body 138. The seal 26 also controls the air pressure in the central longitudinal cavity 60 of the tube 16 through the support tubes 84 passing through the seal 26 and replaces the sealing function of the nip rollers used in closed tube processes.

TUBE CUTTER

The tube cutter 34 is mounted on the frame 44 downline of the transport mechanism 28 for cutting the tube 16 into a continuous elongate strip 12. The cutter 34 also defines the open end of the central cavity 60 of the tube 16, and the tube cutter 34 is offset at an angle with respect to the downline direction. The cutter 34 produces a flat web or strip 12 of material having any width from 5 mm up to the circumference of the material tube 16. The width is therefore infinitely variable and can be changed on the fly without stopping the process. The cutter 34, unlike prior cutters, slits on a large bias angle, thereby eliminating crossweb caliper variation problems such as hard bands, and producing very stable rolls. On webs formed by conventional methods, caliper variations build on themselves. That is, when the web is finally wound, the variations cause bumps which are located in the same location on the roll with each winding of the web such that their effects are magnified. In contradistinction, because the tube cutter 34 here uses large slitting angles, any caliper variations do not line up when the web 12 is wound. Thus, the caliper differences are at an angle to the machine or downweb direction so that they are not easily detectable. When using the slitter 34 with an open tube process the die lines, which correspond to the slit angle, are not parallel to the machine or longitudinal direction but preferably are at an angle of 80° to 90° with this direction. Nonetheless, as the slit angle can be controlled, the crossweb variations can be at any angle between 0° and 90°.

Additionally, the tube 16 remains open and cylindrical during the slitting process. This reduces any damage or distortion frequently caused by closing and flattening the tube 16. The simple, integral transport mechanism isolates the slitting process from external forces that can cause poor slit edge quality. Moreover, the tube cutter 34 can use score, shear, or razor slitting systems, depending on the web material, score slitting being used in the illustrated embodiments.

Figure 9:
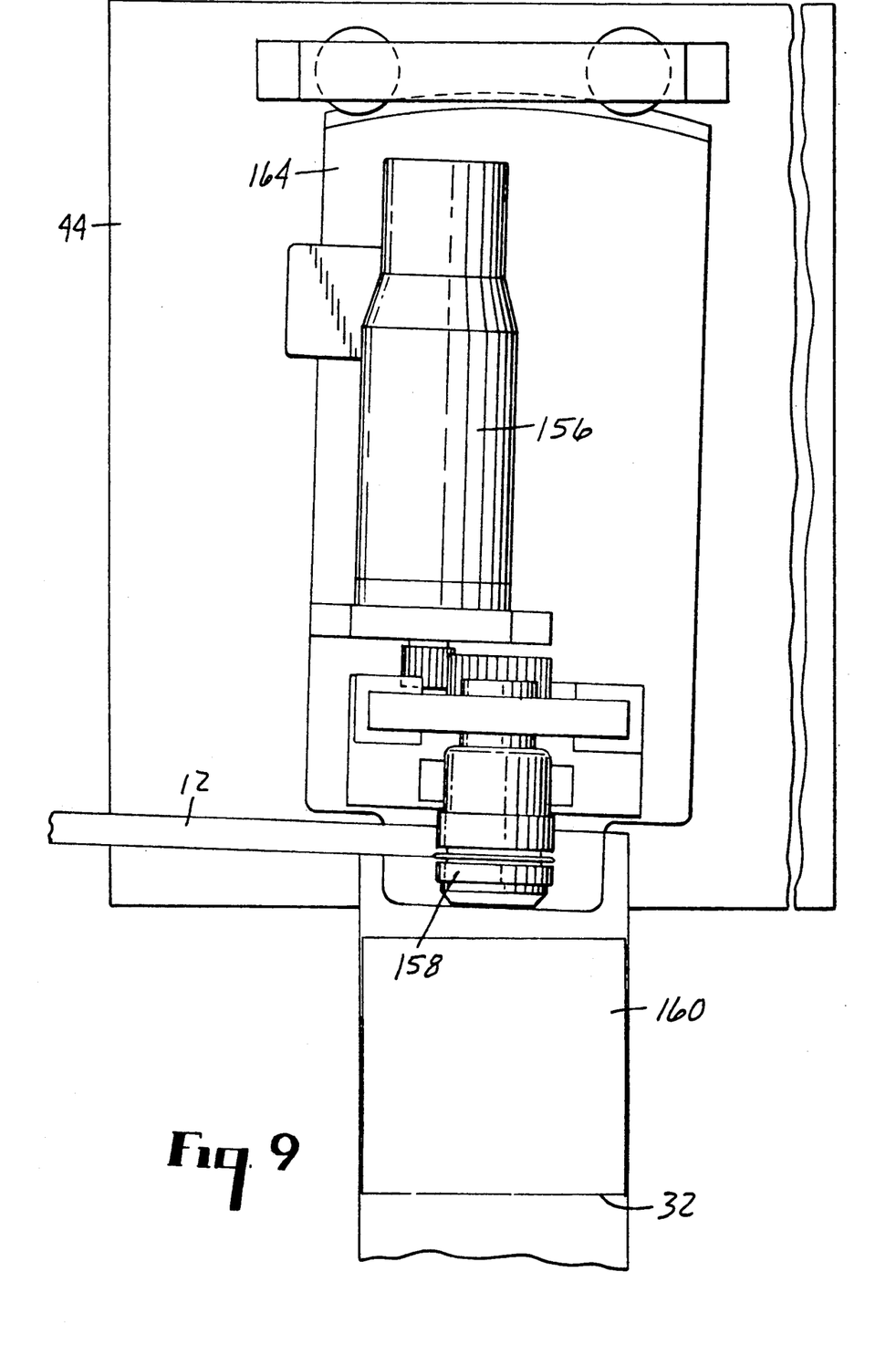
FIG. 9 is front elevation of the tube cutter of FIG. 2.
Figure 10:
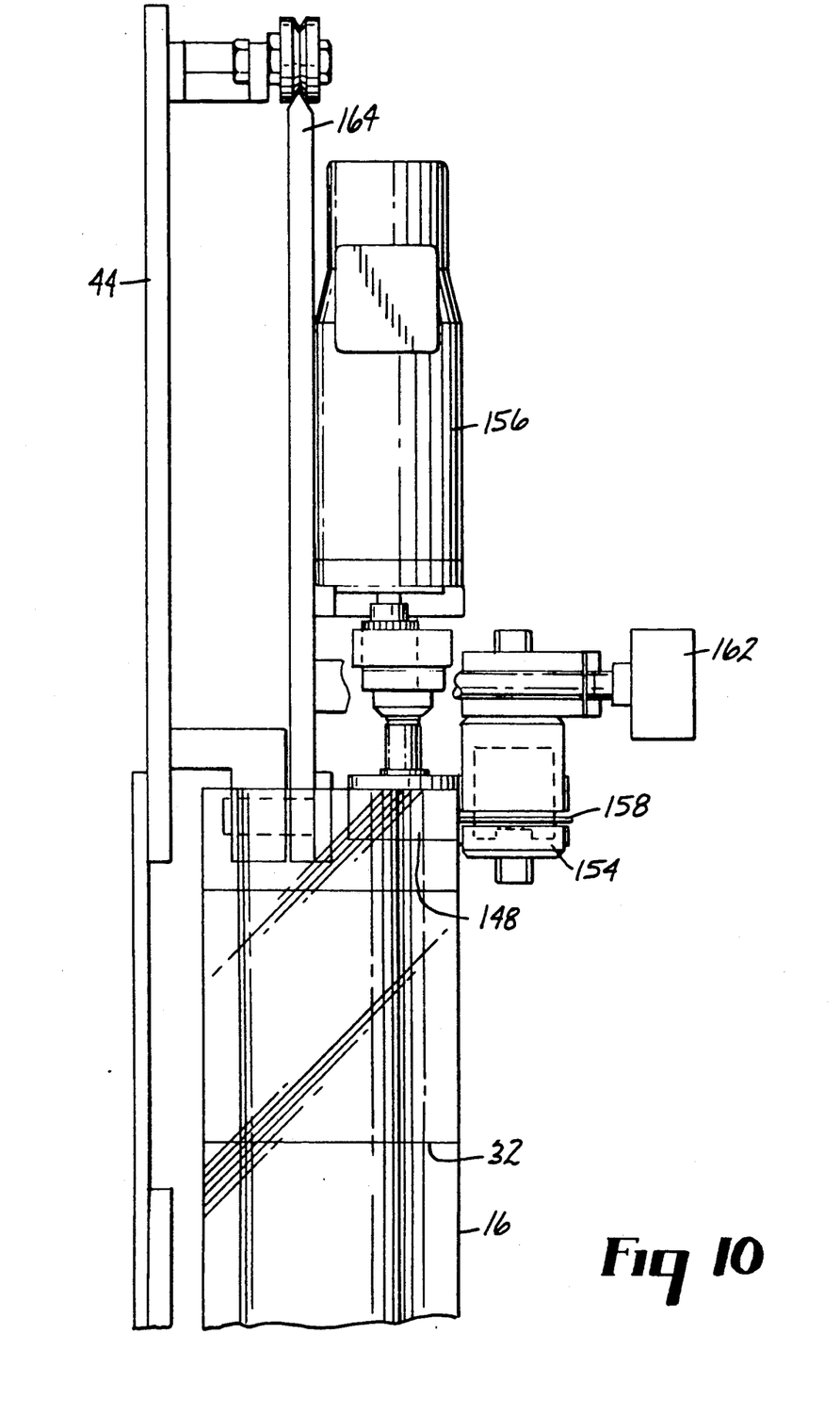
FIG. 10 is a side elevation of the tube cutter of FIGS. 2 and 9, illustrating a mechanism for adjusting the amount the tube cutter is offset with respect to the downline direction.

The tube cutter 34 is best shown in FIGS. 9 and 10 and includes a nip formed between two rollers 148, 150, the angle of which is adjustable relative the downline direction. One nip roller 148 is mounted inside the tube cavity 60 and the other nip roller 150 is mounted on the outside of the tube 16. The outside roller 150 is formed of two halves 152, 154 made of rubber while the inside roller 148 is a hardened steel score roller. The inside roller 148 supplies the drive power to the tube cutter 34. The inside nip roller 148 is driven by a cutter motor 156 which permits the nip rollers 148, 150 to drive the tube 16 in both the rotational and downline directions. The speed of this movement is determined by the nip speed and nip angle. A single score knife 158 is mounted in the gap between the two halves 152, 154 of the outside nip roller 150 to cut or slit the tube 16.

The air bearing mandrel 32 is disposed within the tube cavity 60 downline of the lip seal 26. The air bearing mandrel 32 supports the tube 16 in this location and delivers the tube 16 to the slitter nip in a consistent, cylindrical, wrinkle-free, low friction form. The air supplied through the air mandrel 32 stiffens and lubricates the tube 16 and supplies the internal pressure needed by the transport mechanism 28 to improve drive performance. The mandrel 32 must be a solid cylinder which is perforated or porous in order to maintain the cylindrical tube form. Tube production has been found to be best when the air supplied through the air mandrel 32 maintains the pressure above the lip seal 26 slightly greater than 12.5 mm of water.

The nip between the nip rollers 148, 150 is opened and closed by an air cylinder 162. Additionally, the slit angle of the nip rollers 148, 150 is varied by pivoting the tube cutter 34 relative the frame 44. This is accomplished by mounting the tube cutter 34 on a mounting plate 164 which pivots relative the frame 44. With this system, the width of the final web 12 of material can be controlled and varied by various methods. Because the tube 16 rotates relative the tube cutter 34, these methods vary the width of the web 12 using a single score knife 158. In one method, the slit angle is overset. That is, the angle of the nip rollers 148, 150 must be set slightly greater than predicted to accommodate the back tension due to lateral slip or walking at or before the nip area. The velocity of the web 12 in the downline direction is adjusted by changing the speed of rotation of the transport mechanism rollers 30 while the rotational speed of the tube 16 remains constant.

In a preferred method, after the slit angle is overset, the rotational speed of the tube 16 is adjusted by changing the speed of rotation of the die 14, transport mechanism 28, and slitter nip rollers 148, 150 while maintaining a constant downline tube velocity. Once again, the excess nip angle is compensated by the lateral slip in the nip. The rotational speed adjustment therefore becomes a tension adjustment. This method provides good slit width control.

Additionally, the sensing and controlling system 108 also controls the rotation of the drive rollers 30 of the transport mechanism 28 via the drive motor 78, and the rotational velocity of the extrusion die 14 and transport mechanism 28 relative to the frame 44 to control the slit width.

The slit width, W, is related to the vertical transport velocity ($V_t$, produced by the drive motor 78) and the rotational velocity ($V_r$, produced by the rotational motor 74, the driver 64, and the radius of the tube 16). The equation is as follows:

$$W = 2 \pi r (\sin a)$$

where $$\tan a = \frac{2 \pi r V_r}{V_t}$$

r is the radius of the tube 16, and a is the angle from the downline direction of the cut of the tube 16.

In alternative embodiments, the tube 16 need not rotate and therefore none of the die 14, transport mechanism 28, or tube cutter 34 rotate. Absent rotation, a multiple knife tube cutter is used to vary the web width.

OPERATION

The apparatus 10 operates to produce an elongate strip of material 12 in the following manner. First, flowable material such as a polyolefin like polyethylene is extruded from extruders 20 and through the annular orifice of the rotating die 14 in a downline direction to form the open-ended tube 16 with a generally cylindrical central longitudinal cavity 60. As the tube 16 is formed, the central longitudinal cavity 60 of the tube 16 is pressurized with a fluid, preferably air, to expand the tube 16 laterally outwardly to a desired outer diameter within a predetermined range. The tube 16 is initially transported downline by a pair of startup nip rollers 166 which retract away from the tube 16 after the forming operation is in progress. The tube 16 is transported downline by the transport mechanism 28 which engages and pulls the tube 16, and rotates in synchronism with the extrusion die 14.

The position of the tube 16 and its outer diameter are controlled by moving the tube 16 through the diameter constraining structure 24 which does not rotate. The constraining structure 24 has an annular microporous sleeve 92 such that the tube 16 solidifies within the sleeve 92 with the desired outer diameter. Pressurized air is forced through the microporous sleeve 92 into the central passageway 94 of the constraining structure 24 to form a thin layer of air 98 at a higher pressure than ambient air along the sleeve 92 which constrains the tube 16 therein. The thin air layer 98 formed along the inner surface of the sleeve 92 is at a sufficiently large pressure to constrain the tube 16 to the desired outer diameter while the tube 16 solidifies and to prevent the tube 16 from contacting the sleeve 92. The air pressure increases adjacent portions of the tube 16 which expand toward the sleeve to restrict air flow to force the tube 16 laterally inwardly and away from the sleeve 92 to stabilize the tube 16 within the central passageway 94.

The outer diameter of the portion of the tube 16 prior to entering the constraining structure passageway 94 is sensed to adjust the air pressure inside the tube 16 to expand or contract the tube 16 when the sensed portion of the tube 16 varies from the desired range. This is accomplished by the optical sensing devices 114, 116 which optically sense when the outer diameter of the tube 16 entering the passageway 94 is larger than a first predetermined size or smaller than a second predetermined size. A feedback signal is provided to lower air pressure within the tube 16 when the outer diameter is larger than the first predetermined size and to increase air pressure when the outer diameter is smaller than the second predetermined size.

After passing through the constraining structure 24, the tube 16 is pulled over the lip seal 26 which maintains the pressure in the upline section of the tube 16, while allowing controlled access through passageways 144 in the seal body 138. Finally, the tube 16 floats over the air bearing mandrel 32 and is then cut with a stationary score knife 158 into a continuous elongate strip 12 at an angle offset from the downline direction. The relative rotation between the tube 16 and the cutter 34 enables the tube 16 to be cut by a single blade into a continuous strip of a desired and varying width as the tube 16 moves downline. This eliminates the edge trim and other waste inherent in first cutting the tube 16 into a full circumference flat or folded sheet. The rotational velocity of the the extrusion die 14, the transport mechanism 28, and the cutter 34, and the downweb speed of the tube 16 are controlled by the sensing and controlling system 108 to vary the width of the elongate strip 12. The lip seal 26 prevents escape of the pressurizing air through the open end of the tube cavity 60.

In addition to providing a range of width options, rotating the tube 16 more uniformly distributes die lines or caliper variations in the finished web 12. Moreover, rotation permits blown films of lower inherent strengths to be formed as compared with pulling a tubular film over mandrels. With this apparatus 10, the die lines or lines of extrusion are parallel to the direction of extrusion. These die lines can range between 0° and 90° from the length direction of the finished web. Moreover, the finished web is smooth. That is, there are no creases in the finished web created by the nip rollers 148, 150 of the tube cutter 34. This contrasts with webs produced with spiral cutters which produce nip roller creases, and with systems which use oscillating or rotating blown film dies which can only orient extrusion from 0° to 5° with the length direction of the finished web.

As is apparent, the novel open tube web forming apparatus, system, and method provide superior webs. Many of the components of the system have been developed specifically for this system and are themselves independently novel.

Numerous characteristics, advantages, and embodiments of the invention have been described in detail in the foregoing description with reference to the accompanying drawings. However, the disclosure is illustrative only and the invention is not intended to be limited to the precise embodiments illustrated. Various changes and modifications may be effected therein by one skilled in the art without departing from the scope or spirit of the invention. For example the apparatus and method can be used for making non-blown tubes or annuluses and can be adapted for use in a liquid environment in which the tube is not blown and no frame may be required.

We claim:

1. An apparatus for producing an elongate strip of material comprising:
   an extrusion die for continuously extruding a flowable material in a downline direction to form a tube with a generally cylindrical central longitudinal cavity;
   tube pressurizing means for controlling tube volume in the central longitudinal cavity of the tube to expand the tube laterally outwardly and control the diameter of the tube;
   means for controlling the diameter of the tube located to cause the tube to reach its final size before solidifying within the controlling means;
   a transport mechanism for engaging and pulling the tube in the downline direction without distorting or closing the tube, while allowing access to the central longitudinal cavity of the tube from the downline side of the tube, the transport mechanism including a plurality of drive rollers which engage the tube on only the outside of the tube to pull to the tube downline without contacting the inside of the tube;
   tube cutting means downline of the transport mechanism for cutting the tube into a continuous elongate strip and thereby defining an open end of the central longitudinal cavity of the tube, wherein the tube cutting means is offset at an angle with respect to the downline direction, and wherein the tube remains open and in tube form until the tube is cut; and
   a fluid seal for substantially sealing the cavity of the tube to control the escape of pressurizing fluid from the open end of the cavity, wherein a portion of the central longitudinal cavity extends downline of the fluid seal, and the tube cutting means is positioned downline of the fluid seal.

2. The apparatus of claim 1 wherein the transport mechanism comprises four drive rollers.

3. The apparatus of claim 1 further comprising means for providing relative rotation between the tube and the tube cutting means such that the tube cutting means cuts the tube into a substantially continuous web of a desired width as the tube moves downline.

4. The apparatus of claim 3 wherein the relative rotation providing means provides relative rotation between (a) the tube cutting means and (b) the extrusion die and transport mechanism which rotate together to rotate the tube.

5. The apparatus of claim 4 further comprising a controller for controlling the rotational velocity of the extrusion die, the transport mechanism, and the tube cutting means to affect the width of the elongate strip.

6. The apparatus of claim 1 wherein the tube cutting means comprises a blade positioned downline of the fluid seal and outside of the tube, and nip rolls adjacent the blade which constrain and drive the material of the tube while cutting the tube into an elongate strip with the blade.

7. The apparatus of claim 1 wherein the pressurizing fluid is air.

8. The apparatus of claim 7 wherein the controlling means comprises a constraining structure located between the extrusion die and the transport mechanism which controls expansion of the tube to a desired outer diameter range after the tube is formed by the extrusion die, the constraining structure comprising:
    a casing positioned downline of the extrusion die;
    a sleeve in the casing having an interior passageway with at least a portion having a constant cross-sectional shape and constant circumference adapted to receive the tube to permit movement of the tube along its longitudinal axis in the downline direction, the casing and the sleeve having low friction walls.

9. The apparatus of claim 8 wherein the sleeve is annular and the passageway is centrally located within the annular sleeve and is generally cylindrical.

10. The apparatus of claim 9 wherein the casing and the sleeve walls define a gas chamber separate from the passageway; and the constraining structure further comprises a gas inlet for providing pressurized gas to the gas chamber from a source of pressurized gas; wherein the sleeve has a sufficiently large porosity which permits gas to pass through the sleeve from the gas chamber to the passageway, the gas forming a gas layer along the inner surface of the sleeve at a sufficiently large pressure to constrain the tube to the desired outer diameter while the tube solidifies and to prevent the tube from contacting the sleeve, and the sleeve has a sufficiently low porosity that the gas pressure increases adjacent portions of the tube which expand toward the sleeve to restrict gas flow to force the tube laterally inwardly and away from the sleeve to stabilize the tube within the central passageway.

11. The apparatus of claim 9 further comprising tube sensing means for sensing a portion of the tube before the tube enters the passageway and for providing a signal to the tube pressurizing means for pressurizing the tube to adjust the air volume inside the tube to adjust the tube diameter when the sensed portion of the tube varies from the desired range.

12. The apparatus of claim 11 wherein the tube sensing means comprises:
    first optical sensing means for sensing a portion of the tube when the outer diameter of the tube entering the passageway is larger than a first predetermined size and for providing a feedback signal to the tube pressurizing means when the outer diameter is larger than the first predetermined size; and
    second optical sensing means for sensing a portion of the tube when the outer diameter of the tube entering the passageway is smaller than a second predetermined size smaller than the first predetermined size and for providing a feedback signal to the tube pressurizing means when the outer diameter of the tube is smaller than the second predetermined size.

13. The apparatus of claim 9 further comprising positioning means for adjustably mounting the constraining structure relative to the extrusion die such that the constraining structure can be adjustably positioned within a predetermined range in the upline or downline directions so that the tube solidifies within the passageway of the casing, the sleeve having a length generally parallel to the central longitudinal axis of the passageway of between one half and three times the diameter of the passageway.

14. A method of producing an elongate strip of material comprising the steps of:
    extruding flowable material through an annular die orifice in a downline direction to form an open-ended tube with a generally cylindrical central longitudinal cavity;
    pressurizing the central longitudinal cavity of the tube with a fluid to expand the tube laterally outwardly to an outer diameter within a predetermined range;
    transporting the tube downline with a transport mechanism by engaging the tube on only the outside of the tube to pull to the tube downline without contacting the inside of the tube, distorting the tube, or closing the tube, while allowing access to the central longitudinal cavity of the tube from the downline side of the tube;
    constraining the tube to control the diameter of the tube and cause the tube to reach its final size before solidifying while being constrained;
    cutting the tube with a cutter into a continuous elongate strip at the open end at an angle offset from the downline direction, wherein the tube remains open and in tube form until the tube is cut; and
    preventing escape of the pressurizing fluid through the open end of the cavity.

15. The method of claim 14 further comprising the step of providing relative rotation between the tube and the cutter such that the cutter cuts the tube into a continuous strip of a desired width as the tube moves downline.

16. The method of claim 15 wherein the step of providing relative rotation comprises rotating the extrusion die and transport mechanism together to rotate the tube relative to the cutter.

17. The method of claim 15 further comprising the step of controlling the rotational velocity of the the extrusion die, the transport mechanism, and the cutter to vary the width of the elongate strip 18. The method of claim 14 wherein the tube is pressurized with air.

19. The method of claim 18 wherein the constraining step comprises moving the tube in the downline direction through an annular sleeve such that the tube solidifies within the sleeve which provides a restraint such that the outer diameter is within the desired range.

20. The method of claim 19 wherein the annular sleeve is microporous and includes a central passageway, and the method further comprises the steps of:
    forcing pressurized gas through the microporous sleeve into the central passageway to form a thin layer of gas at a higher pressure than ambient air along the microporous sleeve; and
    constraining the portion of the tube within the passageway with the thin layer of gas, wherein the sleeve has a sufficiently large porosity which permits gas to pass through the sleeve from the gas chamber to the passageway, the gas forming a gas layer along the inner surface of the sleeve at a sufficiently large pressure to constrain the tube to the desired outer diameter while the tube solidifies and to prevent the tube from contacting the sleeve, and the sleeve has a sufficiently low porosity that the gas pressure increases adjacent portions of the tube which expand toward the sleeve to restrict gas flow to force the tube laterally inwardly and away from the sleeve to stabilize the tube within the central passageway.

21. The method of claim 20 further comprising the step of sensing a portion of the tube before the tube enters the passageway and providing a signal to adjust the gas volume inside the tube to expand or contract the tube when the sensed portion of the tube varies from the desired range.

22. The method of claim 21 wherein the step of sensing a portion of the tube comprises the steps of:

optically sensing a portion of the tube when the outer diameter of the tube entering the passageway is larger than a first predetermined size and providing a feedback signal to lower air volume within the tube when the outer diameter is larger than the first predetermined size; and optically sensing a portion of the tube when the outer diameter of the tube entering the passageway is smaller than a second predetermined size smaller than the first predetermined size and providing a feedback signal to increase air volume within the tube when the outer diameter of the tube is smaller than the second predetermined size.

23. The method of claim 19 further comprising the step of positioning the annular sleeve relative to the extrusion die such that the tube material solidifies within the passageway.

* * * * *